United States Patent [19]
Fukushi

[11] Patent Number: 5,838,208
[45] Date of Patent: Nov. 17, 1998

[54] MODULATION OF TRANSMISSION DATA SIGNAL IN SYCHRONOUS WITH TRANSMISSION CLOCK SIGNAL

[75] Inventor: Mikio Fukushi, Tokyo, Japan

[73] Assignee: NEC Corporation, Japan

[21] Appl. No.: 920,046

[22] Filed: Aug. 28, 1997

[30] Foreign Application Priority Data

Sep. 3, 1996 [JP] Japan .................................. 8-232997

[51] Int. Cl.⁶ .............................. H03C 3/00; H04L 27/12
[52] U.S. Cl. ........................................... 332/101; 375/305
[58] Field of Search ................................... 332/100–105; 375/274, 303–307

[56] References Cited

U.S. PATENT DOCUMENTS

| | | | |
|---|---|---|---|
| 3,845,412 | 10/1974 | Rearwin et al. | 329/9 R |
| 3,973,201 | 8/1976 | Andren | 325/163 |
| 4,656,646 | 4/1987 | Ryan | 375/47 |
| 4,897,620 | 1/1990 | Paradise | 332/100 |
| 5,036,296 | 7/1991 | Yoshida | 331/17 |
| 5,459,762 | 10/1995 | Wang et al. | 375/336 |

FOREIGN PATENT DOCUMENTS 0329537  8/1989  European Pat. Off. ............... 375/274

OTHER PUBLICATIONS

By Murano and Unagami, "Digital Signal Processing in Information Transmission", Published from Shokodo, Nov. 1987, pp. 20–29.

*Primary Examiner*—David Mis
*Attorney, Agent, or Firm*—Ostrolenk, Faber, Gerb & Soffen, LLP

[57] ABSTRACT

In a modulating system, a converting unit generates first and second quadrature signals based on a transmission data signal in synchronous with a transmission clock signal. First and second filters perform band limitation to the first and second quadrature signals to generate first and second band-limited quadrature signals. An oscillator generates a sine wave signal and a phase shifter phase-shifts the sine wave signal from the oscillator to generate first and second phase-shifted sine wave signals. A phase difference between them is $\pi/2$, and the first phased-shifted sine wave signal precedes the second phased-shifted sine wave signal in the phase. First and second multipliers multiply the first and second phase-shifted sine wave signals by the first and second band-limited quadrature signals to generate first and second multiplied signals, respectively. An adder synthesizes the first and second multiplied signals to generate an synthesis signal. Then, a limiter for limiting an amplitude of the synthesis signal to a predetermined level.

14 Claims, 5 Drawing Sheets

MODULATION OF TRANSMISSION DATA SIGNAL IN SYCHRONOUS WITH TRANSMISSION CLOCK SIGNAL

BACKGROUND OF THE INVENTION

1. Field of the Invention

The invention relates to a modulating system and a modulation method, and more particularly to a gaussian minimum shift keying (GMSK) modulating system which is used for mobile communication or the like and a modulation method for the same.

2. Description of Related Art

Conventionally, in a gaussian minimum shift keying (GMSK) modulating system, a signal processing has been performed by using an analog circuit. In recent years, however, a digital signal processing is used in order to miniaturize a circuit, and a digital circuit for the digital signal processing is realized as an LSI. As representative systems for generating a sine wave signal in such a digital signal processing, there are two systems: a system using a memory and a processing system by a digital calculation, as described in "Digital Signal Processing in Information Transmission" by Murano and Unagami (Published from Shokodo).

Figure 1:
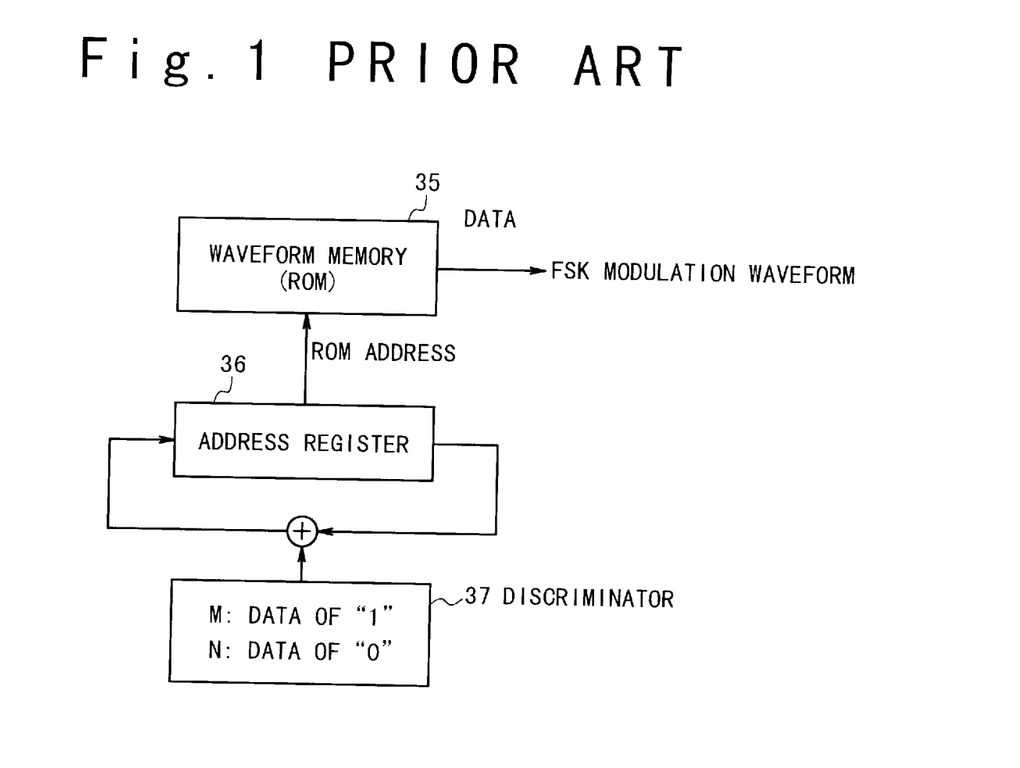
FIG. 1 is a block diagram illustrating the structure of a conventional FSK modulating system.

A conventional sine wave signal generating system in the digital signal processing using the memory will now be described below. The conventional system relates to a sine wave signal generating system for an FSK modulating system which can be applied to the GMSK modulating system. FIG. 1 is a block diagram illustrating an example of the structure of the sine wave signal generating system in the digital signal processing.

A sine wave signal in the FSK modulating system is expressed by $$S(n) = A \sin(2\pi n f_i / f_s)$$

where, n is an integer, i is "1" for data of "0" and 2 for data of "1", when $f_1 > f_2$, and $f_s$ is a sampling frequency. A phase shift quantity $\Delta\theta_i$ which is generated for every sampling is $$\Delta\theta_i = 2\pi f_i / f_s$$

The phase shift quantity is different between the case where data indicates a mark and the case where data indicates a space. Now, assuming that the greatest common measure of $f_1$ and $f_2$ is $f_0$ and $$\Delta\theta_0 = 2\pi f_0 / f_s,$$

the following equations are derived by using N and M which satisfy $f_1 = N \cdot f_0$ and $f_2 = M \cdot f_0$.

$$\Delta\theta_1 = 2\pi f_1 / f_s = 2\pi N f_0 / f_s = N \Delta\theta_0$$

$$\Delta\theta_2 = 2\pi f_2 / f_s = 2\pi M f_0 / f_s = M \Delta\theta_0$$

Therefore, waveform data obtained by sampling a sine wave signal for every phase of $\Delta\theta_0$ are previously stored into a waveform memory 35. When the data of "0" is discriminated by a data discriminator 37, the waveform data is read out the waveform memory 35 for every N samples by use of an address register 36, so that the sine wave signal having the frequency of $f_1$ can be generated. Similarly, when the data of "1" is discriminated by the data discriminator 37, the waveform data is read out from the waveform memory 35 for every M samples by use of the address register 36, so that the sine wave signal having the frequency of $f_2$ can be generated.

As for a conversion from the FSK modulating system to the MSK modulating system, it is sufficient that a modulation shift amount is set to 0.5. In the above-mentioned case, the values of M and N are sufficiently multiplied by 0.5. In case of converting to the GMSK modulating system, the waveform data stored in the waveform memory 35 is generated as a value in which an input signal and an impulse response of a Gaussian filter have been convoluted.

However, in the conventional modulating system as mentioned above, in order to assure an extent of eye patterns of a transmission signal waveform, it is necessary to set the filter sampling frequency to a value of four or more times as high as a data transmission rate. Therefore, there is a problem in that power consumption increases when a GMSK signal is generated at a high transmission rate of tens of Mbps.

Also, in order to digital-to-analog (D/A) convert the waveform data outputted from the waveform memory 35, a high speed D/A converter which can operate at a rate of four times as high as the data transmission rate is needed. Therefore, there is a problem in that the size of a circuit increase and a restriction in realizing the circuit becomes severe.

SUMMARY OF THE INVENTION

The present invention is made in consideration of the above-mentioned problems in the conventional technique. An object of the present invention is to provide a small modulating system in which power consumption can be decreased.

Another object of the present invention is to provide a modulating system in which circuits can be used to operate with the same rate as a data transmission rate.

In order to achieve an aspect of the present invention, a modulating system includes a converting unit for generating first and second quadrature signals based on a transmission data signal in synchronous with a transmission clock signal, first and second filters for performing band limitation to the first and second quadrature signals to generate first and second band-limited quadrature signals, an oscillator for generating a sine wave signal, a phase shifter for phase-shifting the sine wave signal from the oscillator to generate first and second phased-shifted sine wave signals, between which a phase is deviated by $\pi/2$, the first phase-shifted sine wave signal preceding the second phase-shifted sine wave signal in the phase, first and second multipliers for multiplying the first and second phase-shifted sine wave signals by the first and second band-limited quadrature signals to generate first and second multiplied signals, respectively, an adder for synthesizing the first and second multiplied signals to generate an synthesis signal, and a limiter for limiting an amplitude of the synthesis signal to a predetermined level.

The converting unit includes a differential converting section for converting the transmission data signal into a process data signal in synchronous with the transmission clock signal, the process data signal indicating a phase rotated state for every clock, and a signal generating section for generating the first and second quadrature signals from the process data signal in synchronous with the transmission clock signal.

In this case, the signal generating section may output the first and second quadrature signals of 0 and 0 in the phase rotated state of "0", 0 and 1 in the phase rotated state of "$\pi/2$", 1 and 1 in the phase rotated state of "$\pi$", and 1 and 0 in the phase rotated state of "$3\pi/2$" from the process data signal, respectively.

Also, the differential converting section may invert the transmission signal and generates the process data signal whose upper bit is the inverted transmission data signal and whose lower bit is always "1". In this case, the signal generating section includes a 2-bit adder for adding the process data signal in a current clock and an addition data signal in synchronous with the transmission clock signal to output a 2-bit addition result signal, first and second latch circuits for latching upper and lower bits of the 2-bit addition result signal in synchronous with the transmission clock signal to output the latched upper and lower bits to the 2-bit adder as the addition data signal in a next clock, the latched upper bit being the first quadrature signal, and an exclusive OR gate for calculating exclusive OR of the latched upper and lower bits to generate the calculating result as the second quadrature signal.

In order to achieve another aspect of the present invention, a modulating system includes a converting unit for generating first and second quadrature signals based on a transmission data signal in synchronous with a transmission clock signal, an oscillator for generating a sine wave signal, a phase shifter for phase-shifting the sine wave signal from the oscillator to generate phase-shifted sine wave signals, between which a phase is deviated by π/2, the first phase-shifted sine wave signal preceding the second phase-shifted sine wave signal in the phase, first and second multipliers for multiplying the first and second phase-shifted sine wave signals by the first and second quadrature signals to generate first and second multiplied signals, respectively, an adder for synthesizing the first and second multiplied signals to generate an synthesis signal, a filter for performing band limitation to the synthesis signal to generate a band-limited synthesis signal, and a limiter for limiting an amplitude of the band-limited synthesis signal to a predetermined level.

In order to achieve still another aspect of the present invention, a method of a transmission data signal in a modulating system, includes the steps of:

generating first and second quadrature signals based on a transmission data signal in synchronous with a transmission clock signal;

phase-shifting a sine wave signal from to generate phase-shifted sine wave signals, between which a phase is deviated by π/2;

generating a band-limited synthesis signal from the first and second quadrature signals and the phase-shifted sine wave signals in synchronous with the transmission clock signal; and limiting an amplitude of the band-limited synthesis signal to a predetermined level.

BRIEF DESCRIPTION OF THE DRAWINGS

FIG. 4, 4A to 4C are timing charts to explain the operation of the modulating system according to a first embodiment of the present invention;

FIG. 6, 6A to 6D are timing charts to explain the operation of the differential converting section shown in FIG. 6.

DESCRIPTION OF THE PREFERRED EMBODIMENTS

A modulating system of the invention will be described below in detail with reference to the accompanying drawings.

Figure 2:
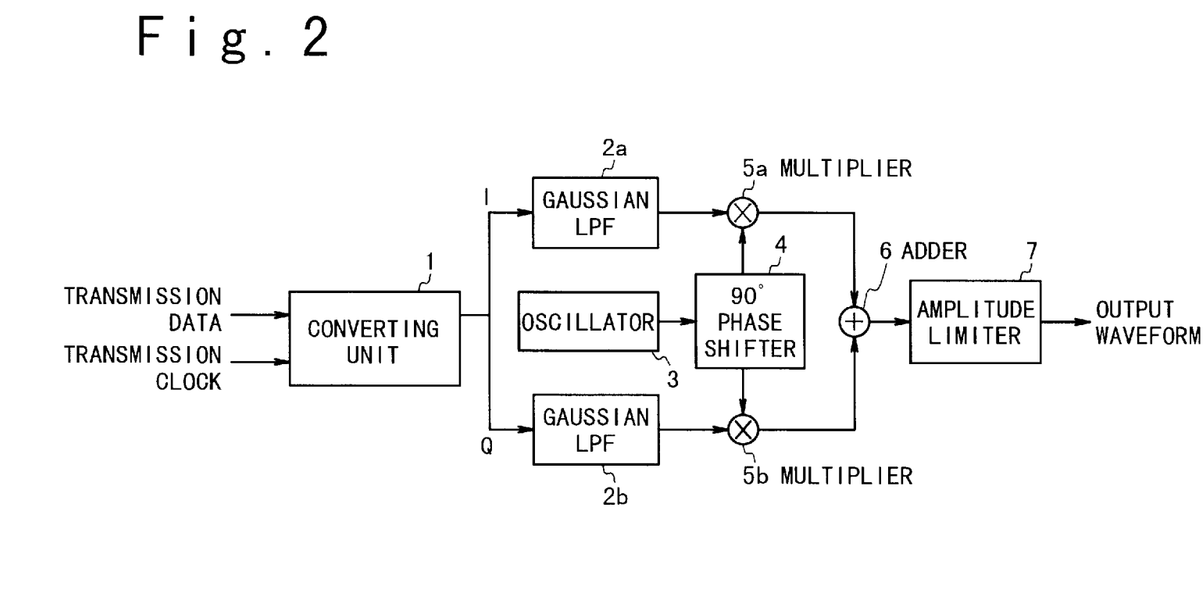
FIG. 2 is a block diagram illustrating the structure of a modulating system according to a first embodiment of the present invention.

First, the modulating system according to the first embodiment of the present invention will now be described below in detail. FIG. 2 is a block diagram illustrating the structure of the modulating system in the first embodiment. Referring to FIG. 2, the modulating system in the first embodiment is composed of a converting unit 1, Gaussian filters 2a and 2b, an oscillator 33, a 90° phase shifter 4, multipliers 5a and 5b, an adder 6, and an amplitude limiter 7. The converting unit 1 inputs a transmission data signal and a transmission clock signal and generates two quadrature signals, i.e., an I data signal and a Q data signal on the basis of the inputted transmission data signal in synchronous with the transmission clock signal. The Gaussian filters 2a and 2b as first and second low pass filters performs band limitation to base bands of the I data signal and Q data signal outputted from the converting unit 1, respectively. The oscillator 3 generates a sine wave oscillation signal having a predetermined frequency. The phase shifter 4 as a quadrature modulator shifts a phase of the sine wave oscillation signal generated from the oscillator 3 by 90 degrees to first and second quadrature sine wave signals. The first multiplier 5a multiplies the I data signal passed through the Gaussian filter 2a by the first sine wave signal outputted from the phase shifter 4. The second multiplier 5b multiplies the Q data signal passed through the Gaussian filter 2b and the second since wave signal outputted from the phase shifter 4. The first sine wave signal precedes the second sine wave signal in phase by 90 degrees. The adder 6 adding a multiplication resultant signal outputted from the multiplier 5a and a multiplication resultant signal outputted from the multiplier 5b to generate a synthesis signal. The amplitude limiter 7 limits the synthesis signal outputted from the adder 6 to a constant amplitude. A BT value indicative of the band limitation of the Gaussian filters 2a and 2b is set to a value of 0.8 time as much as that of a normal Gaussian filter.

Figure 3:
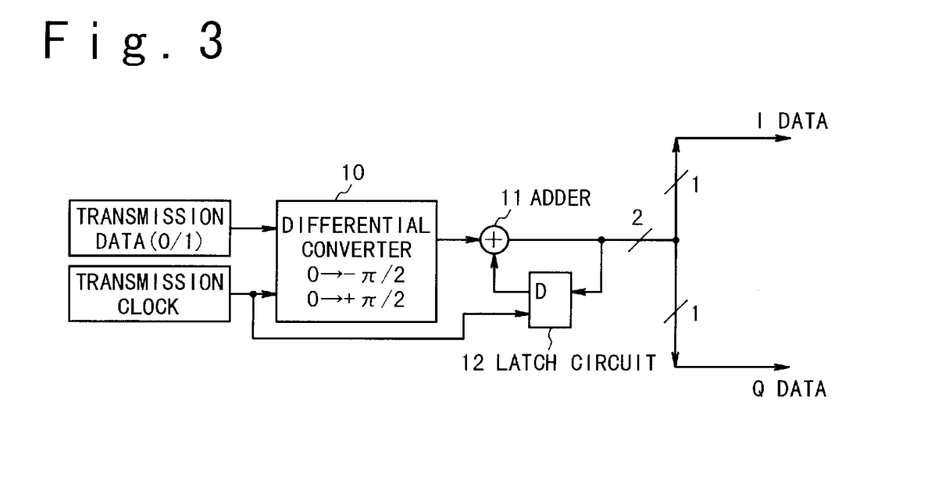
FIG. 3 is a block diagram illustrating the structure of a converting unit shown in FIG. 2.

FIG. 3 is a diagram illustrating the structure of the converting unit 1 shown in FIG. 2. Referring to FIG. 2, the converting unit 1 in the first embodiment is composed of a differential converter 10, an adder 11 and a latch circuit 12. The differential converter 10 changes the phase of an output data signal on the basis of the inputted transmission data. That is, the differential converter 10 rotates the phase of the output data signal by −π/2 when the transmission data signal of "0" is inputted, and rotates the phase of the output data signal by +π/2 when the transmission data signal of "1" is supplied. The phase of the output data signal in a previous clock is latched in the latch circuit 12. The phase of the output data signal in the previous clock is added to the phase of the output data signal in a current clock in the adder 11.

Figure 4:
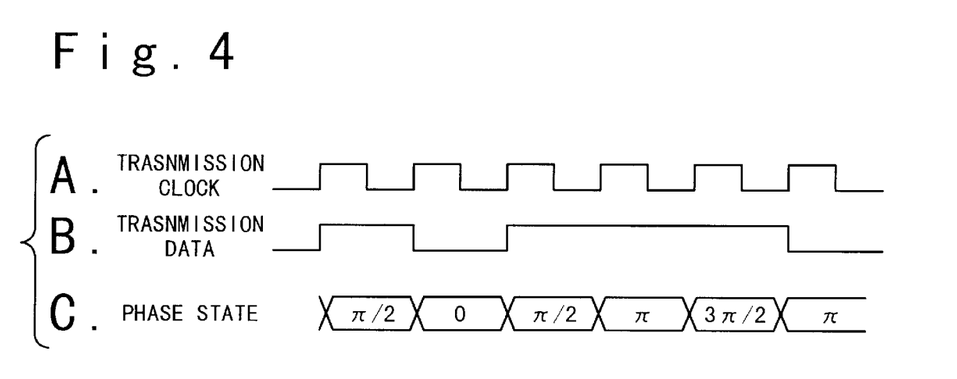

The modulating operation of the modulating system constructed as mentioned above will now be described below. FIGS. 4A to 4C are timing charts for explaining the modulating operation of the modulating system shown in FIG. 2.

As shown in FIG. 4B, it is assumed that the transmission data signal of, for example, "101110" is inputted to the converting unit 1. In this case, the differential converter 10 rotates the phase of the output data signal by −π/2 when the transmission data signal of "0" is inputted, and the phase of the output data signal by +π/2 when the transmission data signal of "1" is inputted, as described above. As a result, the phase series of the signal outputted from the differential converter 10 becomes "π/2, 0, π/2, π, 3 π/2, and π".

In this instance, the adder 11 has a 2-bit output to indicate four states of the phase. For example, the output bits of the adder 11 are set to (0, 0) in the state of the phase of "0", (0, 1) in the state of the phase of "π/2", (1, 1) in the state of the phase of "π", and (1, 0) in the state of the phase of "3π/2", respectively. In this case, the output bits represent (I data signal, Q data signal).

In order to prevent a situation such that a DC component is outputted when a reference value is set to "0", "−1" and "+1" may be allocated to the output bits from the differential converter 10 in place of "0" and "1", respectively. In this example, the output bits from the differential converter 10 are set to (−1, −1) in the state of the phase of "0", (−1, +1) in the state of the phase of "π/2", (+1, +1) in the state of the phase of "π", and (+1, −1) in the state of the phase of "3π/2", respectively.

After completion of the operation of the converting unit 1 as mentioned above, the I data signal and Q data signal are supplied from the converting unit 1 the Gaussian filters 2a and 2b having the same frequency characteristics, so that the band limitation is performed to a base band. In this instance, an LC filter or an SAW filter can be used as the Gaussian LPFs 2a and 2b. If the BT value indicative of a normalized band width of each of the Gaussian filters 2a and 2b in the first embodiment is set to a value of 0.8 time as large as that of a normal GMSK modulator, almost same spectrum characteristics as those from the normal GMSK modulator can be derived from the Gaussian filters 2a and 2b. In order to obtain the spectrum of the GMSK modulation of BT=0.3, the band limitation to the base band is performed at a BT value of 0.24 (=0.3×0.8).

After that, the filtered signals passed through the Gaussian filters 2a and 2b are quadrature modulated. In the quadrature modulation, the sine wave oscillation signals which has been generated from the oscillator 3 and whose phase is deviated by 90 degrees by the phase shifter 4 and the I data signal and Q data signal which passed through the Gaussian filters 2a and 2b are multiplied by the multipliers 5a and 5b, respectively.

The waveforms of the multiplied low frequency components are synthesized by the adder 6. In this instance, since the amplitude of a quadrature modulation signal synthesized in the adder 6 is not constant, the amplitude of the quadrature modulation signal is limited to a constant amplitude by the amplitude limiter 7. As a result, spectrum characteristics which are almost equivalent to those of the GMSK modulation signal can be obtained.

Figure 5:
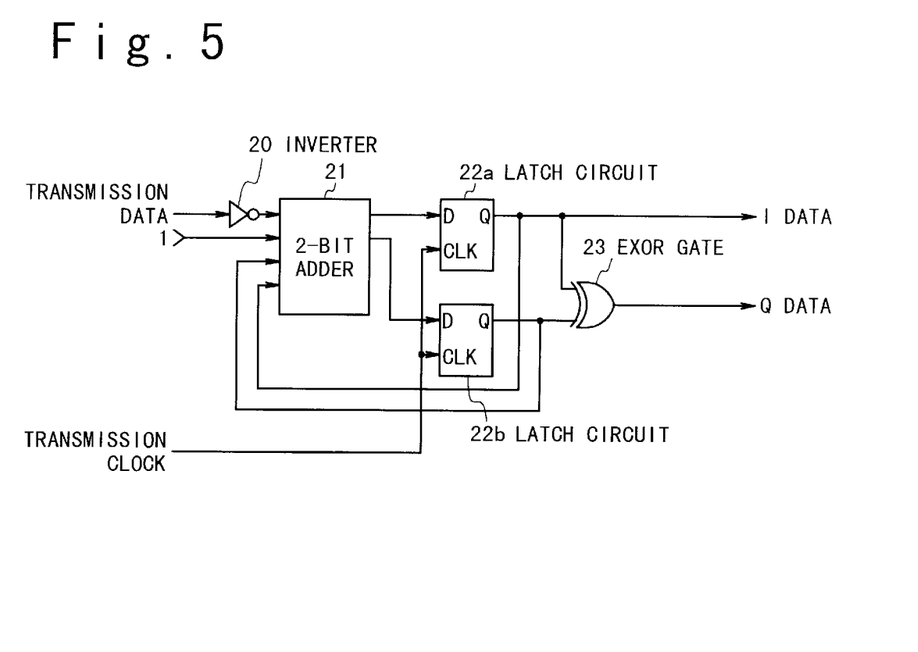
FIG. 5 is a circuit diagram illustrating the structure of a differential converting section shown in FIG. 3.
Figure 6:
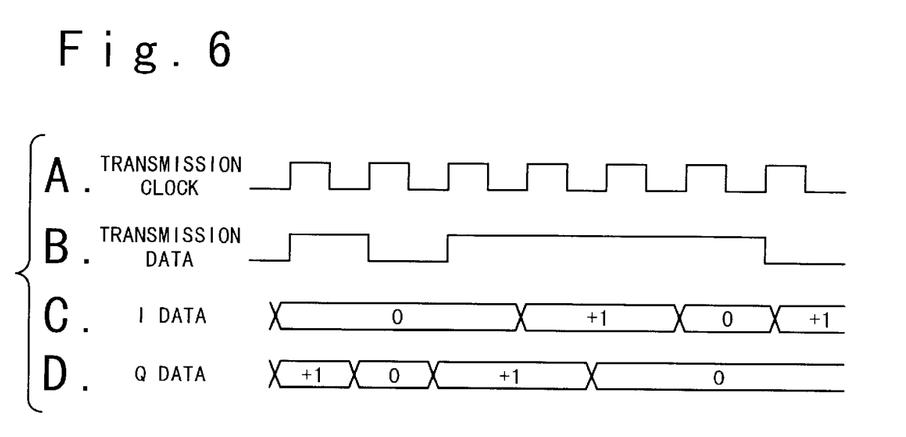

FIG. 5 is a block diagram illustrating the structure of the converting unit 1 in the first embodiment shown in FIG. 2. Referring to FIG. 5, the converting unit 1 in the first embodiment is composed of an inverter 20, a 2-bit adder 21, and latch circuits 22a and 22b, an exclusive OR (EXOR) gate 23. The inverter 20 inverts the transmission data signal as an upper bit of a 2-bit transmission data signal to supply to the 2-bit adder 21. The 2-bit adder 21 receives a lower bit of the 2-bit transmission data signal which is always "1". The 2-bit adder 21 converts the phase of an output signal in accordance with inputted transmission data signal. The latch circuits 22a and 22b latches signals outputted from the 2-bit adder 21. The EXOR circuit 23 calculates the exclusive OR of signals outputted from the latch circuits 22a and 22b.

As described above, the 2-bit transmission data signal is inputted to the 2-bit adder 21. The lower bit of the transmission data signal is always set to "1" and the upper bit of the transmission data signal is inputted through the inverting circuit 20. That is, when the upper bit of the transmission data signal is equal to "1", "01" is supplied to the 2-bit adder 21. When the upper bit of the transmission data signal is equal to "0", "11" is supplied to the 2-bit adder 21.

In order to calculate a phase rotation quantity, the output bits of the 2-bit adder 21 are held in the latch circuits 22a and 22b as a phase state in a previous clock in synchronous with the transmission clock signal. When the next transmission data signal is inputted to the 2-bit adder 21 in synchronous with the transmission clock signal, the phase state of the transmission data signal in a current clock is added to the phase state of the transmission data signal in the previous clock. Thus, a phase change can be determined. However, if the addition is simply performing when the upper bit sequence of the transmission data signal is, for example, "1, 1, 1", output values, i.e., (I data, Q data) of the latch circuits 22a and 22b become (0, 1), (1, 0), and (1, 1). When the values are changes from (0, 1) to (1, 0), both of the I data and the Q data are simultaneously changed during a single clock. This situation means that the phase changes by an amount of π. In the GMSK modulation, however, a change amount during a single clock must be equal to ±π/2 and either one of the I data and the Q data can change. In order to avoid this state, therefore, the calculation of MOD2 of the I data signal and the Q data signal is performed and a resultant output value are set to the Q data signal. The calculation of MOD2 is realized by the EXOR circuit 23.

The operation of the converting unit 1 will now be described below. FIGS. 6A to 6D are timing charts for explaining the operation of the converting unit 1 shown in FIG. 5.

The transmission data signal and transmission clock signal are inputted to the differential converter 1 as shown in FIGS. 7A and 7B. It is assumed that the transmission data signal is supplied to the inverter 20 in synchronous with the transmission clock signal. Also, it is assumed that all of initial values of the 2-bit adder 21 and latch circuits 22a and 22b shown in FIG. 5 are equal to "0".

"1" is always inputted to the adder 21 as the lower bit of the 2-bit transmission data signal. Therefore, when the upper bit of the transmission data signal is equal to "0", the data of "11" is inputted to the 2-bit adder 21, because the upper bit is inverted by the inverter 20. Also, when the upper bit of the transmission data signal is equal to "1", the upper bit is converted and the 2-bit data of "01" is supplied to the 2-bit adder 21.

As shown in FIG. 7B, assuming that the transmission data signal is "1011110 . . . ", the 2-bit data of "01" is inputted to the 2-bit adder 21, because the transmission data signal is initially equal to "1". As a result, the output values of (I data, Q data) are set to (0, 1).

Subsequently, when the transmission data signal of "0" is inputted in the next clock, an input of the 2-bit adder 21 is set to "11", so that the output values (I data, Q data) are set to (0, 0).

When the transmission data signal of "1" is inputted in the next clock, the output values of (I data, Q data) are similarly set to (0, 1). When the transmission data signal of "1" is inputted in the next clock, although the outputs of the 2-bit adder 21 are set to (1, 0), the I data and the Q data are set to be equal to (1, 1) by the EXOR circuit 23.

When the above processing is similarly performed, the I data signal and the Q data signal for the inputted transmission data signal change as follows.

I data: 0, 0, 0, +1, +1, 0, +1, . . .

Q data: +1, 0, +1, +1, 0, 0, 0, . . .

Where, (0, 0) of the I data signal and Q data signal indicates the phase of 0, (0, +1) indicates the phase of $\pi/2$, (+1, +1) indicates the phase of $\pi$, and (+1, 0) indicates the phase of $3\pi/2$.

Figure 7:
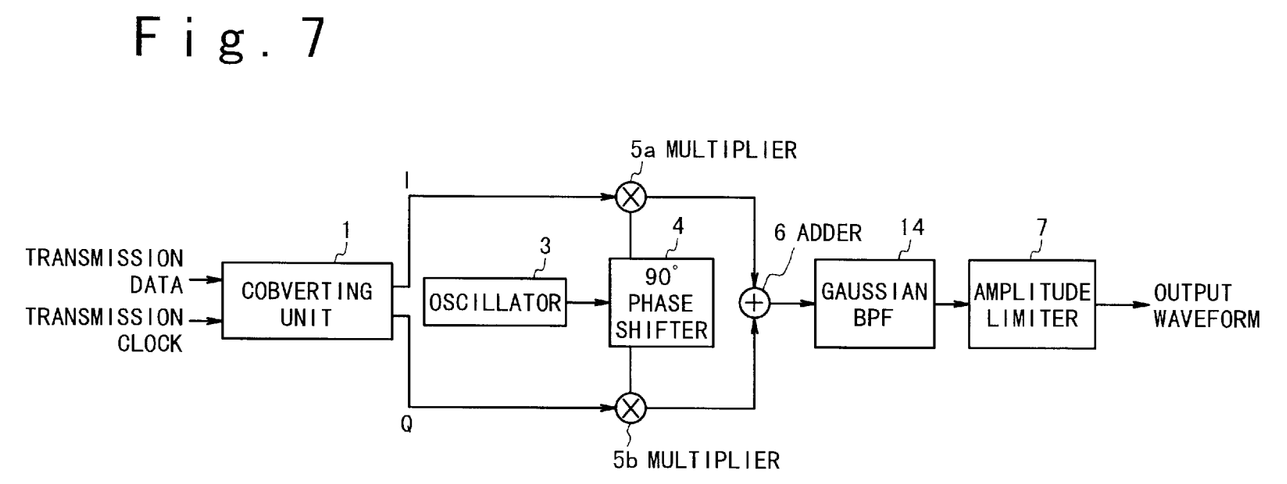
FIG. 7 is a block diagram illustrating the structure of a modulating system according to a second embodiment of the present invention.

FIG. 7 is a block diagram illustrating the structure of the modulating system according to the second embodiment of the present invention. According to the second embodiment, as shown in FIG. 7, the Gaussian filters 2a and 2b are removed from the modulating system shown in FIG. 2, and a Gaussian band pass filter (BPF) 14 is provided between the adder 6 and the amplitude limiter 7 in the first embodiment shown in FIG. 2. The other construction and operation are similar to those shown in FIG. 2. Therefore, the description is omitted.

Since the invention is constructed as mentioned above, the following effects can be obtained.

According to the modulating systems of the present invention, the converting unit generates the signals of 0 or 1 as the I data signal and Q data signal such that the phase of the output signal is changed by $-\pi/2$ or $+\pi/2$ for the transmission data signal of 0 or 1. The output signals from the converting unit as the I data signal and the Q data signal are independent. The I data signal and the Q data signal are passed through the filters having the same frequency characteristics and are further quadrature modulated. After that, the modulated signals are added and the added signal is limited to a constant amplitude by the amplitude limiter. In this manner, a modulated signal can be obtained to have the spectrum characteristics which are almost the same as those of the GMSK modulation. Therefore, it is sufficient that the modulating system operates at the same rate as the transmission bit rate of the transmission clock signal. Thus, the small modulating system having low power consumption can be provided.

What is claimed is:

1. A modulating system comprising:

a converting unit for generating first and second quadrature signals based on a transmission data signal in synchronous with a transmission clock signal;

first and second filters for performing band limitation to said first and second quadrature signals to generate first and second band-limited quadrature signals;

an oscillator for generating a sine wave signal;

a phase shifter for phase-shifting said sine wave signal from said oscillator to generate first and second phase-shifted sine wave signals, between which a phase is deviated by $\pi/2$, said first phase-shifted sine wave signal preceding said second phase-shifted sine wave signal in the phase;

first and second multipliers for multiplying said first and second phase-shifted sine wave signals by said first and second band-limited quadrature signals to generate first and second multiplied signals, respectively;

an adder for synthesizing said first and second multiplied signals to generate an synthesis signal; and a limiter for limiting an amplitude of said synthesis signal to a predetermined level.

2. A modulating system according to claim 1, wherein said converting unit comprises:

a differential converting section for converting said transmission data signal into a process data signal in synchronous with said transmission clock signal, said process data signal indicating a phase rotated state for every clock; and a signal generating section for generating said first and second quadrature signals from said process data signal in synchronous with said transmission clock signal.

3. A modulating system according to claim 2, wherein said signal generating section outputs said first and second quadrature signals of 0 and 0 in the phase rotated state of "0", 0 and 1 in the phase rotated state of "$\pi/2$", 1 and 1 in the phase rotated state of "$\pi$", and 1 and 0 in the phase rotated state of "$3\pi/2$" from said process data signal, respectively.

4. A modulating system according to claim 2, wherein said differential converting section inverts said transmission signal and generates said process data signal whose upper bit is the inverted transmission data signal and whose lower bit is always "1", and wherein said signal generating section includes:

a 2-bit adder for adding said process data signal in a current clock and an addition data signal in synchronous with said transmission clock signal to output a 2-bit addition result signal;

first and second latch circuits for latching upper and lower bits of the 2-bit addition result signal in synchronous with said transmission clock signal to output the latched upper and lower bits to said 2-bit adder as said addition data signal in a next clock, said latched upper bit being said first quadrature signal; and an exclusive OR gate for calculating exclusive OR of said latched upper and lower bits to generate the calculating result as said second quadrature signal.

5. A modulating system comprising:

a converting unit for generating first and second quadrature signals based on a transmission data signal in synchronous with a transmission clock signal;

an oscillator for generating a sine wave signal;

a phase shifter for phase-shifting said sine wave signal from said oscillator to generate phased-shifted sine wave signals, between which a phase is deviated by $\pi/2$, said first phase-shifted sine wave signal preceding said second phase-shifted sine wave signal in the phase;

first and second multipliers for multiplying said first and second phase-shifted sine wave signals by said first and second quadrature signals to generate first and second multiplied signals, respectively;

an adder for synthesizing said first and second multiplied signals to generate an synthesis signal;

a filter for performing band limitation to said synthesis signal to generate a band-limited synthesis signal; and a limiter for limiting an amplitude of said band-limited synthesis signal to a predetermined level.

6. A modulating system according to claim 5, wherein said converting unit comprises:

a differential converting section for converting said transmission data signal into a process data signal in synchronous with said transmission clock signal, said process data signal indicating a phase rotated state for every clock; and a signal generating section for generating said first and second quadrature signals from said process data signal in synchronous with said transmission clock signal.

7. A modulating system according to claim 6, wherein said signal generating section outputs said first and second quadrature signals of 0 and 0 in the phase rotated state of "0", 0 and 1 in the phase rotated state of "$\pi/2$", 1 and 1 in the phase rotated state of "$\pi$", and 1 and 0 in the phase rotated state of "$3\pi/2$" from said process data signal, respectively.

8. A modulating system according to claim 6, wherein said differential converting section inverts said transmission signal and generates said process data signal whose upper bit is the inverted transmission data signal and whose lower bit is always "1", and wherein said signal generating section includes:

a 2-bit adder for adding said process data signal in a current clock and an addition data signal in synchronous with said transmission clock signal to output a 2-bit addition result signal;

first and second latch circuits for latching upper and lower bits of the 2-bit addition result signal in synchronous with said transmission clock signal to output the latched upper and lower bits to said 2-bit adder as said addition data signal in a next clock, said latched upper bit being said first quadrature signal; and an exclusive OR gate for calculating exclusive OR of said latched upper and lower bits to generate the calculating result as said second quadrature signal.

9. A method of a transmission data signal in a modulating system, comprising the steps of:

generating first and second quadrature signals based on a transmission data signal in synchronous with a transmission clock signal;

phase-shifting a sine wave signal from to generate phase-shifted sine wave signals, between which a phase is deviated by $\pi/2$;

generating a band-limited synthesis signal from said first and second quadrature signals and said phase-shifted sine wave signals in synchronous with said transmission clock signal; and limiting an amplitude of said band-limited synthesis signal to a predetermined level.

10. A method according to claim 9, wherein said step of generating a band-limited synthesis signal includes:

performing band limitation to said first and second quadrature signals to generate first and second band-limited quadrature signals;

multiplying said phase-shifted sine wave signals by said first and second band-limited quadrature signals to generate first and second multiplied signals, respectively;

synthesizing said first and second multiplied signals to generate said band-limited synthesis signal.

11. A method according to claim 9, wherein said step of generating a band-limited synthesis signal includes:

multiplying said phase-shifted sine wave signals by said first and second quadrature signals to generate first and second multiplied signals, respectively;

synthesizing said first and second multiplied signals to generate an synthesis signal; and performing band limitation to said synthesis signal to generate said band-limited synthesis signal.

12. A method according to claim 9, wherein said step of generating first and second quadrature signals includes:

converting said transmission data signal into a process data signal in synchronous with said transmission clock signal, said process data signal indicating a phase rotated state for every clock; and generating said first and second quadrature signals from said process data signal in synchronous with said transmission clock signal.

13. A method according to claim 12, wherein said step of generating said first and second quadrature signals from said process data signal includes:

generating said first and second quadrature signals of 0 and 0 in the phase rotated state of "0", 0 and 1 in the phase rotated state of "$\pi/2$", 1 and 1 in the phase rotated state of "$\pi$", and 1 and 0 in the phase rotated state of "$3\pi/2$" from said process data signal, respectively.

14. A method according to claim 12, wherein said step of converting said transmission data signal into a process data signal includes:

inverting said transmission signal and generates said process data signal whose upper bit is the inverted transmission data signal and whose lower bit is always "1", and wherein said step of generating said first and second quadrature signals from said process data signal includes:

adding said process data signal in a current clock and an addition data signal in synchronous with said transmission clock signal to output a 2-bit addition result signal;

latching upper and lower bits of the 2-bit addition result signal in synchronous with said transmission clock signal to output the latched upper and lower bits to said 2-bit adder as said addition data signal in a next clock, said latched upper bit being said first quadrature signal; and calculating exclusive OR of said latched upper and lower bits to generate the calculating result as said second quadrature signal.

* * * * *